United States Patent

Doye et al.

[11] Patent Number: 6,158,111
[45] Date of Patent: Dec. 12, 2000

[54] WIRE HARNESS CONNECTOR INSTALLATION CLIP

[75] Inventors: Dennis Lee Doye, Maumelle; Michael J. Nauman, Little Rock; Michael J. Miskin, Little Rock; Ed Seamands, Little Rock, all of Ark.

[73] Assignee: Molex Incorporated, Lisle, Ill.

[21] Appl. No.: 09/235,954

[22] Filed: Jan. 22, 1999

[51] Int. Cl.[7] .................................................. B23P 19/00
[52] U.S. Cl. .............................................. 29/739; 29/758
[58] Field of Search .............................. 29/750, 755, 758, 29/762, 764, 739, 740, 741; 294/99.1, 99.2; 81/305, 311

[56] References Cited

U.S. PATENT DOCUMENTS

| D. 315,719 | 3/1991 | Cusumano et al. ..................... D13/154 |
| 2,997,326 | 8/1961 | Daum ........................................ 81/311 |
| 3,559,267 | 2/1971 | Castellani . |
| 3,759,559 | 9/1973 | Yuska ....................................... 294/15 |
| 3,845,535 | 11/1974 | Over ................................. 29/203 MW |
| 4,605,256 | 8/1986 | Stokoe ................................... 294/99.2 |
| 4,858,309 | 8/1989 | Korsunsky et al. ...................... 29/764 |
| 5,046,237 | 9/1991 | Conforti et al. .......................... 29/764 |
| 5,142,777 | 9/1992 | Boyer et al. .............................. 29/884 |
| 5,152,052 | 10/1992 | Rantala et al. ............................ 29/764 |
| 5,208,968 | 5/1993 | Camsell et al. ........................... 29/739 |
| 5,265,328 | 11/1993 | Gorman .................................... 29/829 |
| 5,445,527 | 8/1995 | Martin ....................................... 439/78 |
| 5,483,737 | 1/1996 | Tran et al. ................................. 29/747 |
| 5,613,870 | 3/1997 | Traver, Jr. ................................ 439/352 |

*Primary Examiner*—Lee Young
*Attorney, Agent, or Firm*—A. A. Tirva

[57] ABSTRACT

An installation tool for installing multiple connector housings of a wire harness into engagement with opposing connectors includes a handle portion and a connector gripping portion. The handle portion includes openings that accommodate a user's hand and the connector gripping portion includes pairs of first and second engagement arms separated by intervening spaces. Individual connector housings of the wire harness are gripped by pairs of the first and second engagement arms which hold the connectors housings in a preselected alignment and orientation with the connector housings gripped by the engagement arms and with the opposing connectors.

11 Claims, 4 Drawing Sheets

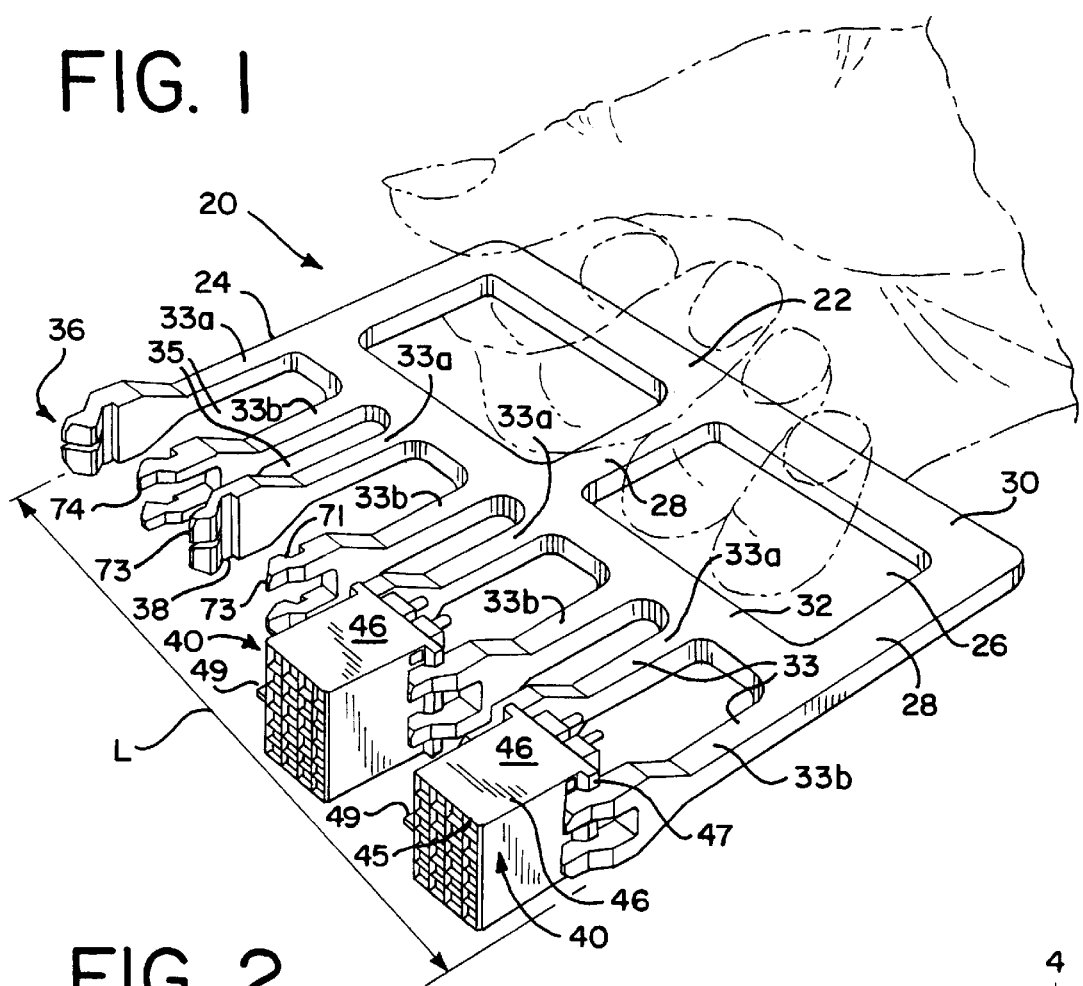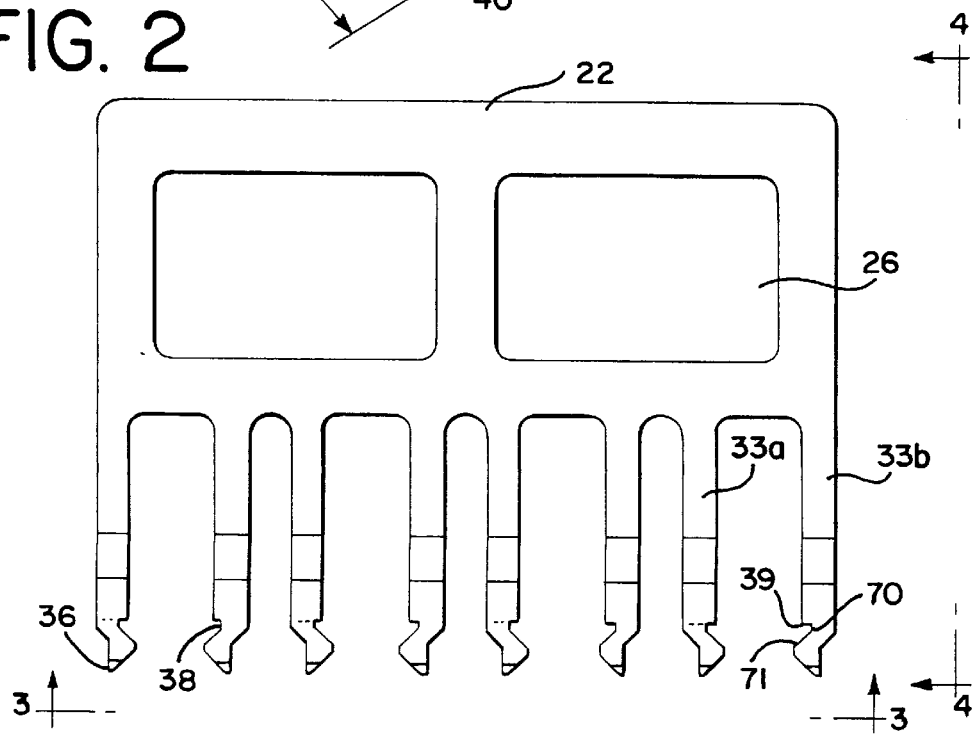

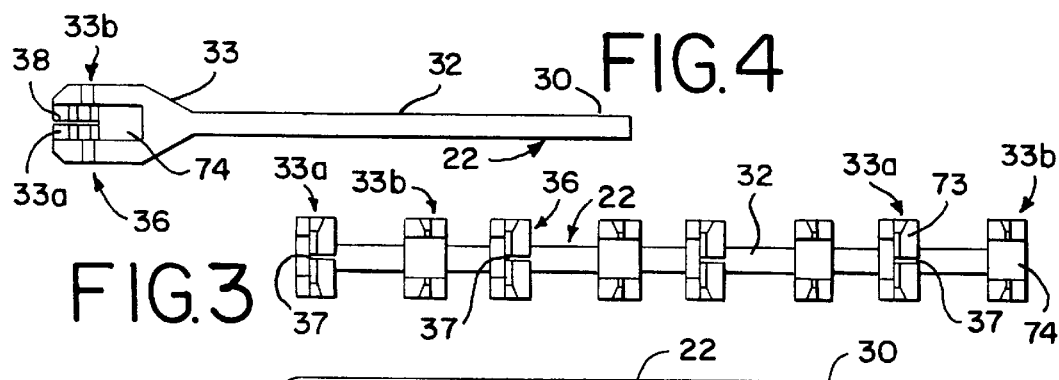
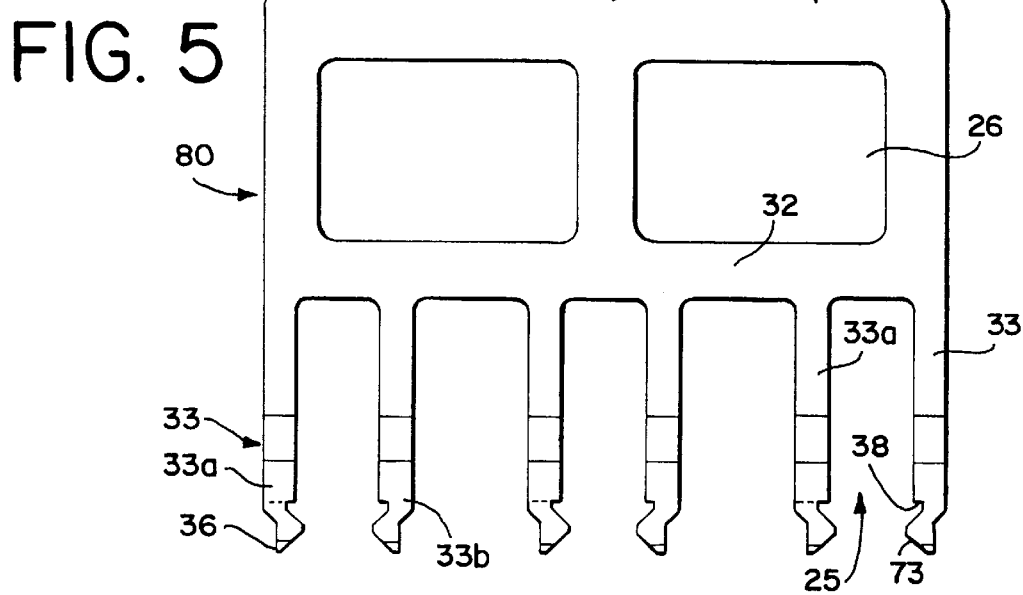
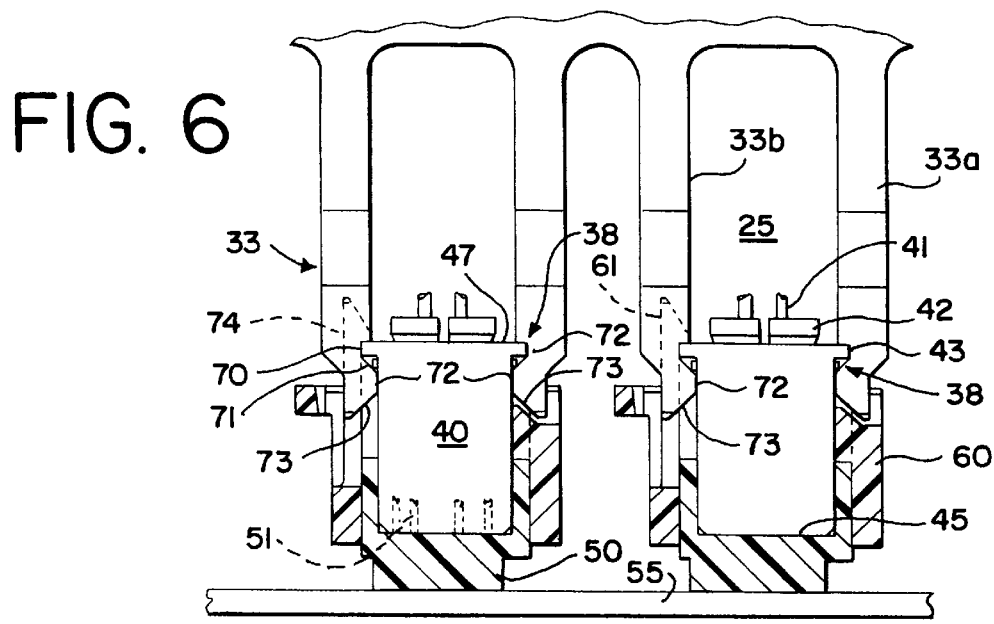

WIRE HARNESS CONNECTOR INSTALLATION CLIP

BACKGROUND OF THE INVENTION

The present invention relates generally to hand-held tools utilized in the installation of wire harness connector housings, and more particularly to a hand-held connector housing installation clip that holds a plurality of wire harness connector housings in a specific alignment and spacing for installation into corresponding opposing connector elements.

In the field of high-efficiency telecommunications, it is not uncommon to have switching assemblies that have a plurality of circuits on master communication circuit boards that must be connected together. These switching assemblies will typically have a plurality of connecting elements, typically in the form of backplane connectors, attached to the master circuit board. The backplane connectors include a plurality of conductive pins that extend upwardly and outwardly therefrom. These backplane connectors are often connected together by way of wire harnesses that interconnect multiple such backplane connectors.

The backplane connectors are often further arranged in side-by-side order in areas of tight clearance, and are typically connected together using wire harnesses. The tight clearance involved in such applications makes it difficult to securely seat the wire harness connectors quickly and reliably, by hand. Additionally, because such installations are performed by hand, they increase the amount of labor required for retrofit and replacement installations.

The prior art, as evidenced by U.S. Pat. No. 5,613,870 which issued Mar. 25, 1997, describes latching systems for connectors that utilize a single handle assembly to both place and retain a connector housing in engagement with an opposing connector housing. The handle assembly in this apparatus is intended to retain the two connector housings together in engagement. The handle assembly is not removable and therefore provides an impediment to installation of connectors and other electronic components in the area nearby the connector.

A need therefore exist for an installation clip that may be utilized to install connector housings and which may be easily removed from the connector housings after their installation so as not to provide an impediment, or obstruction, to installation of further electronic components.

SUMMARY OF THE INVENTION

The present invention overcomes these disadvantages by providing an installation clip that holds a plurality of connector housings of a wire harness in a preselected alignment to facilitate installation thereof into corresponding opposing backplane connector housings. The present invention thereby facilitates and also speeds up the installation of connector housings, especially when terminated to a plurality of harness wires.

Accordingly, it is a general object of the present invention to provide an installation clip for installing multiple connector housings of a wire harness into corresponding openings formed in opposing connector housings.

Another object of the present invention is to provide an installation tool for holding a plurality of wire harness connector housings in a preselected spacing and alignment to facilitate the installation thereof into a corresponding plurality of backplane connectors, the installation tool having a handle portion and a connector gripping portion, the connector gripping portion having a plurality of pairs of connector gripping members extending out from the handle portion, the pairs of connector gripping members terminating in free ends, the free ends having means for holding the connector housings in a preselected orientation for proper engagement with opposing backplane connectors.

To attain these objects, the installation clips of the present invention have a plurality of connector gripping members in the form of elongated engagement arms, arranged in pairs, each pair of engagement arms gripping a single connector housing. The pairs of engagement arms have notches formed therein at a predetermined level that engage opposing surfaces on the connector housings. The notches serve to hold the connector housings in place and in alignment with each other for proper insertion into a backplane connector.

Certain ones of the pairs of the engagement arms are provided with vertical slots that communicate with the notches and which receive polarizing ribs formed on the connector housings to align the connector housings for engagement with the opposing backplane connectors. The slots and the notches cooperatively serve to restrain the connector housings in two dimensions to ensure reliable fit into the opposing backplane connectors. Others of the engagement arms have wider slots that may accommodate latch members of a latching shroud associated with the backplane connector.

These and other objects, features and advantages of the present invention will become apparent from the following detailed description, taken in conjunction with the accompanying drawings, wherein like reference numerals refer to like parts.

BRIEF DESCRIPTION OF THE DRAWINGS

In the course of this detailed description, reference will be made to the accompanying drawings in which:

FIG. 1 is a perspective view of an installation clip constructed in accordance with the principles of the present invention and with two connector housings in place within portions of the clip;

FIG. 2 is a front elevational view of the installation clip of FIG. 1, without the connectors;

FIG. 3 is a bottom plan view of the installation clip of FIG. 2 taken along lines 3—3 thereof;

FIG. 4 is an end elevational view of the installation clip of FIG. 2 taken along lines 4—4 thereof;

FIG. 5 is an elevation view of another embodiment of an installation clip constructed in accordance with the present invention;

FIG. 6 is a front elevational view, partly in section of a portion of the installation clip of FIG. 2 inserting a pair of connector housings in engagement with a backplane connector;

DETAILED DESCRIPTION OF THE PREFERRED EMBODIMENT

Figure 7:
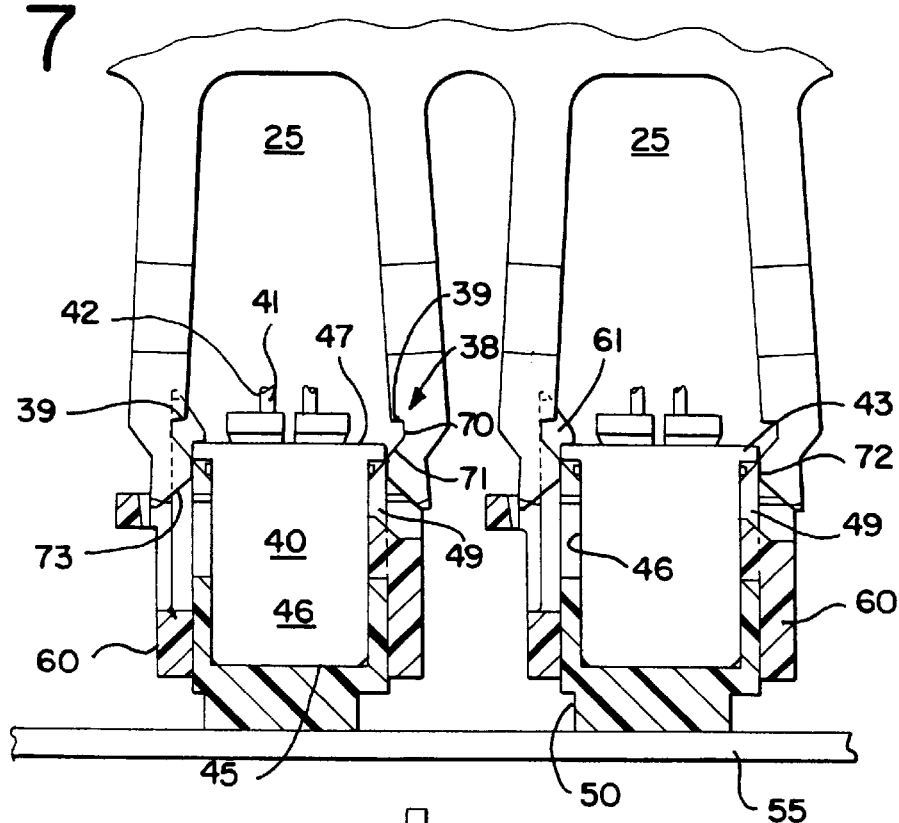
FIG. 7 is the same view as FIG. 6, but illustrating the installation clip being removed from the connector housings.

Turning now to FIG. 1, a wire harness connector installation clip, or tool, constructed in accordance with the principles of the present invention is generally designated at 20. The tool 20 can been seen to have a handle portion 22 and a connector gripping portion 24 spaced therefrom. The handle portion 22 includes one or more openings 26 that are large enough to accommodate all or a portion of a user's hand (shown in phantom in FIG. 1). The openings may be separated and bounded by ribs 28.

The rearmost part of the handle portion 22 is defined by a bar 30 that runs for the entire length L of the tool 20. Another bar 32 of similar length is spaced apart from the handle bar 30 and defines the beginning of the connector gripping portion 24 of the tool 20. In order to grip and contact a plurality of wire harness electrical connector housings 40, the tool 20 includes a plurality of elongated engagement arms 33 that extend away from the bar 32. The engagement arms 33 are arranged in sets of corresponding pairs of arms 33a and 33b each of which are separated by an intervening space 35.

Figure 10:
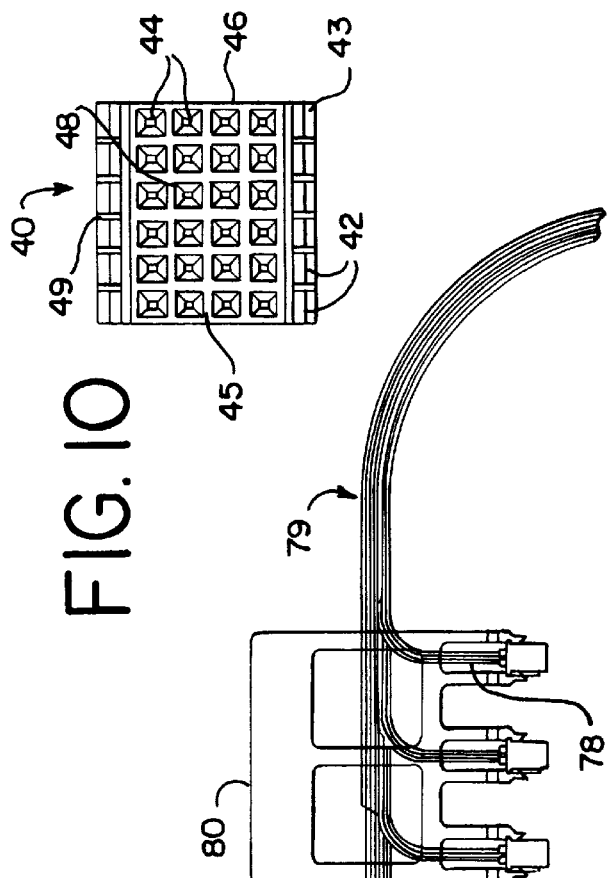

The engagement arms 33 terminate in free ends 36 that grip the connector housings 40. Turning now to FIG. 10, the connector housings 40 are ones that accommodate a plurality of coaxial wires 41 that are terminated to termination heads 42 that in turn have two conductive receptacle terminals (not shown) extending therefrom. The terminals and part of the termination heads 42 are held within the housing 40 and each such receptacle terminals is aligned with a corresponding opening 44 formed in the bottom face 45 of the connector housing 40. The connector housing 40 may be rectangular square or any suitable shape and have a series of sidewalls 46 that extend between the bottom face 45 and the top face 47 to define the overall shape of the connector housing 40.

The openings 41 on the bottom face 45 of the connector housing 40 are conventional pin-receiving openings and as such, they are each surrounded by a series of slanted faces 48 that extend up towards the openings 44. This is to guide conductive pins 51 of an opposing connector 50, typically a backplane connector (as shown in FIG. 6 mounted to a circuit board 55) into the opening 44 and into conductive engagement with the receptacle terminals of the harness wires 41 that are held in the connector housings 40.

In order to properly orient the connector housings 40 into a proper mating alignment with their opposing connectors 50, each connector housing 40 preferably has a polarizing feature, such as the vertical ribs 49 shown in FIGS. 1, 6 and 10. This rib 49, as explained below, is received within both the opposing connector 50 and the particular engagement arm 33a of the installation tool 20. Each connector housing 40 also preferably has a top flange 43 that extends at least on two opposing sides of the connector (FIG. 10) and partly defines the top face 47 of the connector housing 40. The vertical polarizing rib 49 runs up one side of the connector housing 40 where it joins the horizontal flange 43. The flanges 43 of the connector housings 40 may be contacted by a corresponding latch 61 on the opposing connector 50 or on a related latching shroud 60 (FIGS. 6 and 7).

The connector housing flanges 43 also provide points of engagement between the installation tool 20 and the connector housings 40. In an important aspect of the present invention, the engagement arms 33a, are provided with vertical slots 37 formed in their free ends 36 that receive the polarizing ribs 49 of the connector housing as to orient the connector housing 40 in the proper alignment within the installation tool engagement arms 33. These slots 37 preferably have widths that matches the widths of the polarizing ribs 49 so that movement of the connector housing transverse to the length of the installation tool 20 (or into and out of the place of the paper in FIGS. 2 and 5) is substantially prevented and the connector housings 40 are fixed in those directions within the installation tool 20.

In order to ensure the proper alignment of the connector housings 40 in the vertical dimension, each engagement arm 33 is provided with a connector-receiving notch 38 that has, as best shown in FIG. 2, a shoulder portion 39, a side wall portion 70 and a slanted wall portion 71. The shoulder portions 39 preferably have flat profiles so that they will engage the connector housing flanges 43, the side edges of which, as illustrated in FIG. 6 are also engaged by the side wall portions 70 of the engagement arm notches 38. The shoulder portions 39 also limit the movement of the connector housings 40 in the vertical direction so that they are fixed on the installation tool 20 at a proper height for ease of insertion into the corresponding openings 44 of the opposing connectors 50. The side wall portions 71 of the notches 38 also serve to limit the movement of the connector housings 40 along the length L of the installation tool 20. It will then be appreciated that the vertical slots 37 and the horizontal notches 38 of the engagement arms 33 cooperate to locate, and fix, the connector housings 40 in at least two different dimensions, in a preselected spacing and alignment along the length and depth of the installation tool that corresponds to the spacing of the opposing backplane connectors 50 on the printed circuit board 55. The side wall portions 71 will serve to locate and fix the connector housings 40 with respect to the width of the installation tool 20.

In order to avoid colliding with any latches 61 that may project up from an associated latching shroud 60 that is used in conjunction with the backplane connector 50, the installation tool 20 is provided with wide slots 74 formed in the engagement arms 33b (FIG. 4) that lie opposite the engagement arms 33a that engage the polarizing means 49 of the connector housings 40. The slanted surfaces 71 of the engagement arms 33 that define the lower parts of the notches 38 extend into the intervening spaces 35 and terminate in flat abutment portions 72 that project inwardly of the connector housing flanges 43 to lie against the sidewalls 46 as shown in FIG. 6. Additional slanted surfaces are positioned beneath the abutment portions 73 and assist in the insertion of connector housings 40 into the engagement arms 33.

In operation, a plurality of connector housings 40 are inserted into engagement with the engagement arms 33 of the gripping portion 24. The connector housings 40 are inserted into the tool 20 by inserting one of the flanges 43 into one of the two notches 38 and then pivoting the connector housing 40 around that flanges so that the other flanges will impinge upon the lower slanted surfaces 73 of the opposing engagement arm 33 to thereby spread, or "ramp" it outwardly, while the flange rides up over the abutment portion 72 and into the notch 38.

Figure 8:
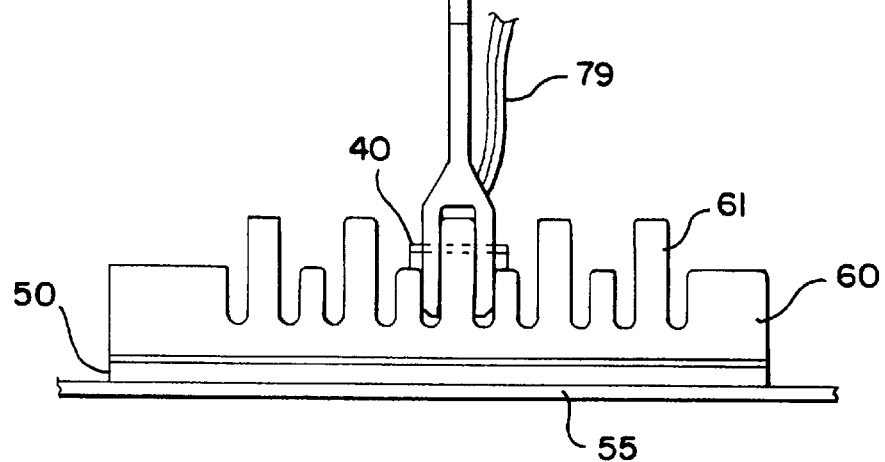
FIG. 8 is an end view of the installation clip of FIG. 2 inserting a set of connector housing into a engagement with a backplane connector.
Figure 9:
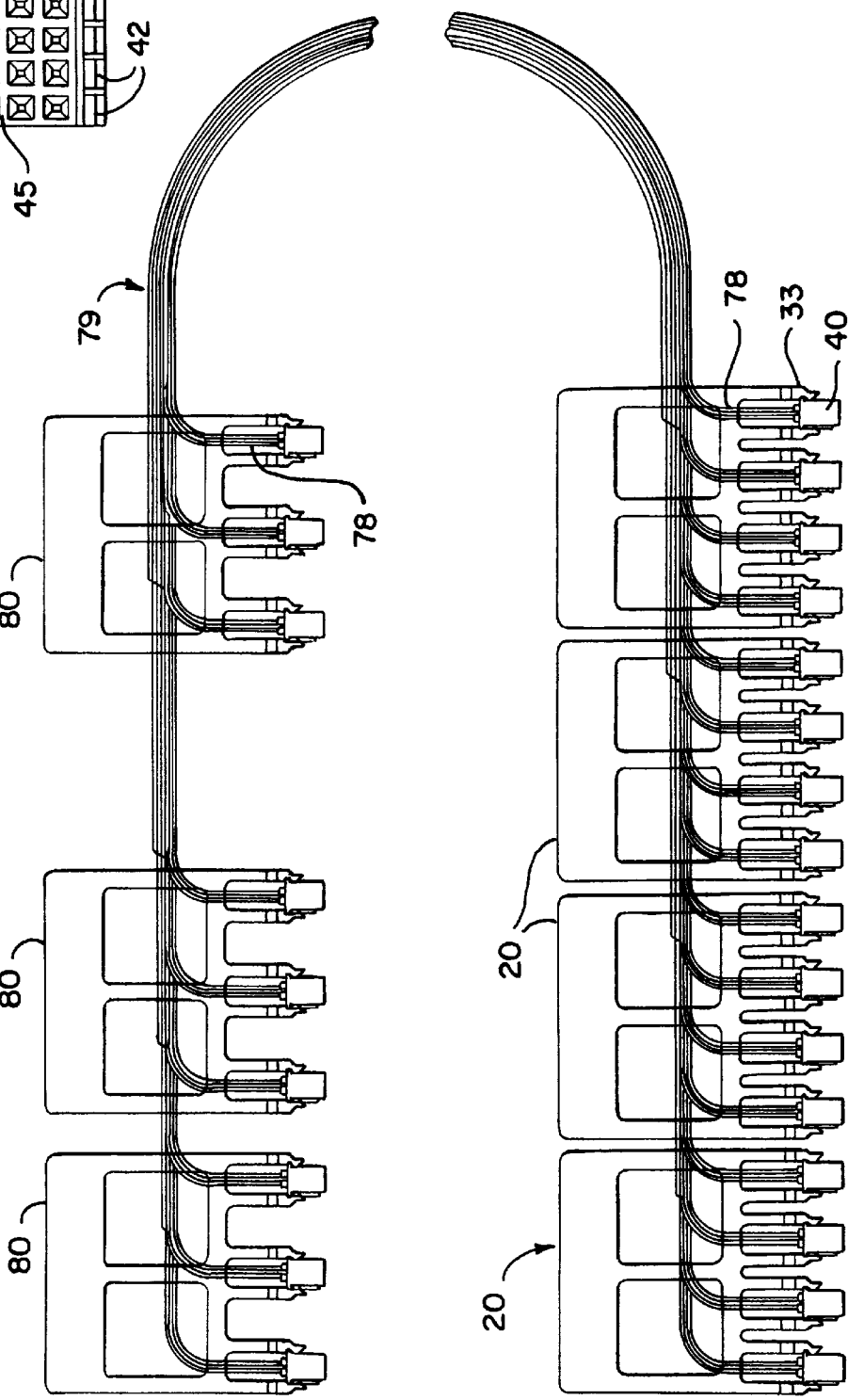
FIG. 9 is a top plan view of an plurality of installation clips of the invention in engagement with a wire harness and illustrated in position for connecting an array of connector housings of the wire harness to opposing connectors; and, FIG. 10 is a bottom plan view of a connector housing used with the installation tool of FIG. 1.

Once the connector housings are fully inserted into the installation clip 20, as shown in FIG. 9, the intervening spaces 25 accommodate portions of the wires 41 of the wire harness 79 will permit installation of the connector housings 40 while terminated to their associated wires 41. The tool 20 (or tools) are then used to insert the wire harness connector housings 40 into receptacles 52 formed in the backplane connectors 50. (FIG. 6.) Typically, the backplane connectors 50 will include some sort of latching mechanism, such as the latches 61 associated with the illustrated latching shroud 60, and the wide channels, or slots 74, accommodate the latches 61 as shown in FIG. 8. The latches 61 will engage the wire harness connector housings 40 and assist the conductive pins 51 of the opposing backplane connector 50 in retaining the connector housings 40 in engagement with the backplane connector 50.

The tool 20 may be removed from the engaged connector housings 40 as shown in FIG. 7 or may be left in place. The upper slanted surfaces 71 of the retention notches 38 will "ride" on and over the connector housing flanges 43 when the tool 20 is either pulled directly up or pivoted upwardly from one corner thereof. As these surfaces 71 ride up on the connector housing flanges 43, the abutment portions 72 of the engagement arms 33 will pull away from engagement with both the side wall 46 of the connector housing 40 and its top flange 43. Because the engagement arms 33 have widths that are greater than the width of the tool handle portion 22 (FIG. 4), they can be considered as defining in cooperation with the intervening spaces 25, rows 78 that receive lengths 79 of the harness wires 41 therein and further facilitate use of the tool 20 and installation of the wire harness 79.

FIG. 5 illustrates a second embodiment 80 of a wire harness connector installation tool constructed in accordance with the principles of the present invention. In this embodiment, all of the structural elements are the same as for the aforementioned embodiment except that three pairs of engagement arms 33 are shown, rather than four pairs.

While the preferred embodiments of the invention have been shown and described, it will be apparent to those skilled in the art that changes and modifications may be made therein without departing from the spirit of the invention, such as the length of the engagement arms and the particular configuration of the notches, the scope of which is defined by the appended claims.

We claim:

1. An installation clip for installing a plurality of electrical connector elements into a corresponding plurality of opposing connector elements arranged in a preselected pattern on a circuit board, the installation clip comprising;

a handle portion, the handle portion having a gripping surface for gripping by a user's hand;

a connector gripping portion spaced apart from said handle portion for gripping a plurality of connector elements and for holding them in place in a preselected orientation and at a preselected level within the connector gripping portion, said connector gripping portion including a plurality of elongated engagement arms extending away from said handle portion, the engagement arms being arranged on said connector gripping portion in discrete pairs of first and second engagement arms, said engagement arms terminating in free end portions, the free ends being separated by intervening spaces for receiving said connector elements therein and which separate said first engagement arms from said second engagement arms, said first and second engagement arm having shoulder portions formed thereon and spaced apart from said free ends for engaging opposing surfaces of said connector elements and for aligning said connector elements in said installation clip when said connector elements are inserted into said intervening spaces between said first and second engagement arms; and wherein each of said first engagement arms includes a polarizing slot formed therein for receiving a polarizing member formed on said connector elements, and each of said second engagement arms includes a channel for receiving latch members associated with said opposing connector elements, said second engagement arm channels having a width greater than that of said first engagement arm polarizing slots.

2. The installation clip as set forth in claim 1, wherein said first and second engagement arms each include notches formed therein, said shoulder portions partially defining said notches.

3. The installation clip as set forth in claim 2, wherein said first and second engagement arms further include slanted surfaces that cooperate with said shoulder portions to partially define said notches.

4. The installation clip as set forth in claim 1, wherein said connector elements include a plurality of sidewalls, one of said connector element sidewalls of each of said connector element having a vertical polarizing member formed thereon, and said installation clip further includes a polarizing slot formed in each of said first engagement arms, the polarizing slot beginning at said first engagement arm free end and extending toward said handle portion.

5. The installation clip as set forth in claim 1, wherein said portions of said engagement arms lie in a common plane.

6. The installation clip as set forth in claim 1, wherein said first and second engagement arms include abutment portions disposed beneath said shoulder portions and extending into said intervening spaces, said abutment portions engaging said connector elements received within said intervening spaces.

7. The installation clip as set forth in claim 1, wherein said first and second engagement arms each include notches formed therein for receiving portions of said connector elements, said shoulder portions of said engagement arms partially defining said notches, said first engagement arm polarizing slots and said second engagement arm channels extending into said notches.

8. The installation clip as set forth in claim 7, wherein said first engagement arm polarizing slots and second engagement arm channels extend vertically in said engagement arms and said notches extend horizontally in said engagement arms.

9. The installation clip as set forth in claim 1, wherein said first engagement arms include respective polarizing slots formed therein for receiving corresponding polarizing members formed on said connector elements, said first and second engagement arms further including notches formed therein for receiving portions of said connector elements, said first engagement arm polarizing slots preventing movement of said connector elements in a first direction when gripped by said first and second engagement arms and said notches preventing movement of said connector elements in a second direction when gripped by said first and second engagement arms.

10. The installation clip as set forth in claim 9, wherein said first and second directions are perpendicular to each other.

11. The installation clip as set forth in claim 1, wherein said first and second engagement arm free ends include slanted surfaces.

* * * * *